July 1, 1969        J. W. COBB        3,452,650
PROCESS AND MACHINERY FOR MAKING PAPER STICKS
Filed Feb. 17, 1966        Sheet 1 of 6
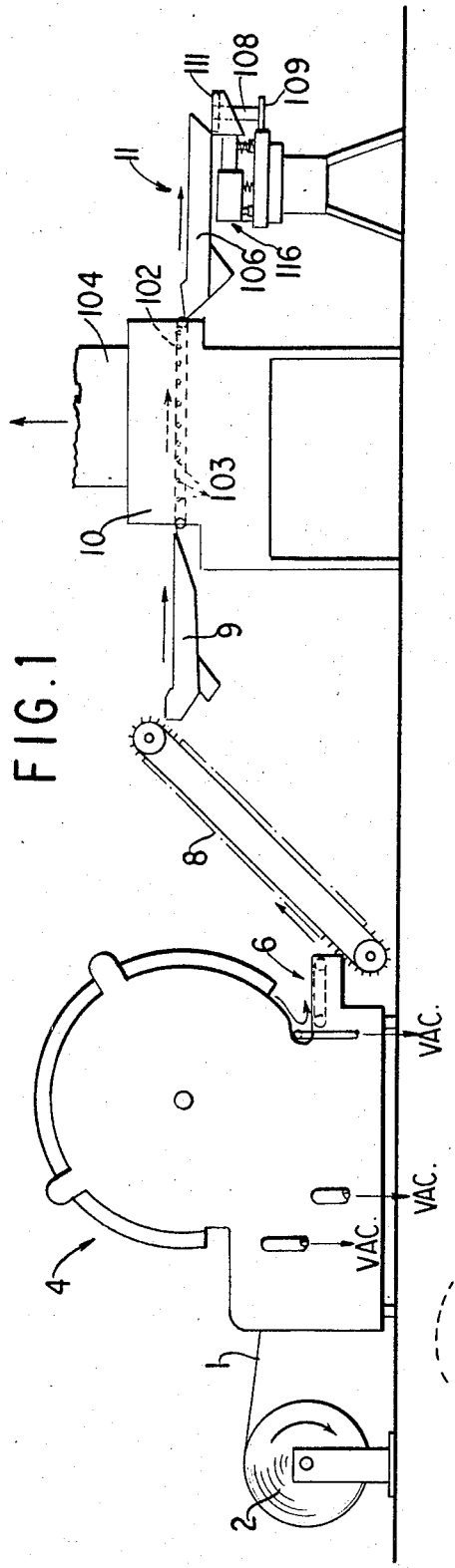
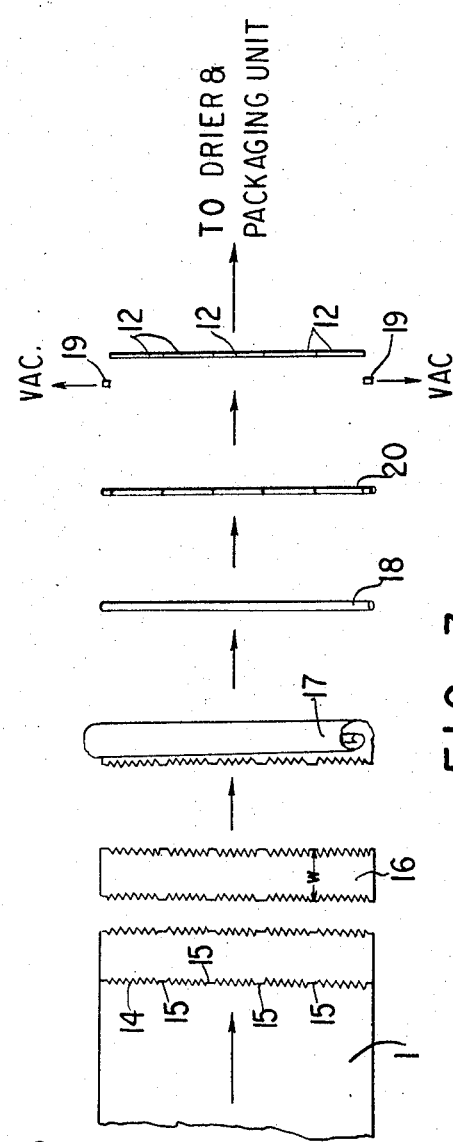
INVENTOR
JAMES W. COBB
BY
Robertson, Bryan, Parmelee & Johnson
ATTORNEYS

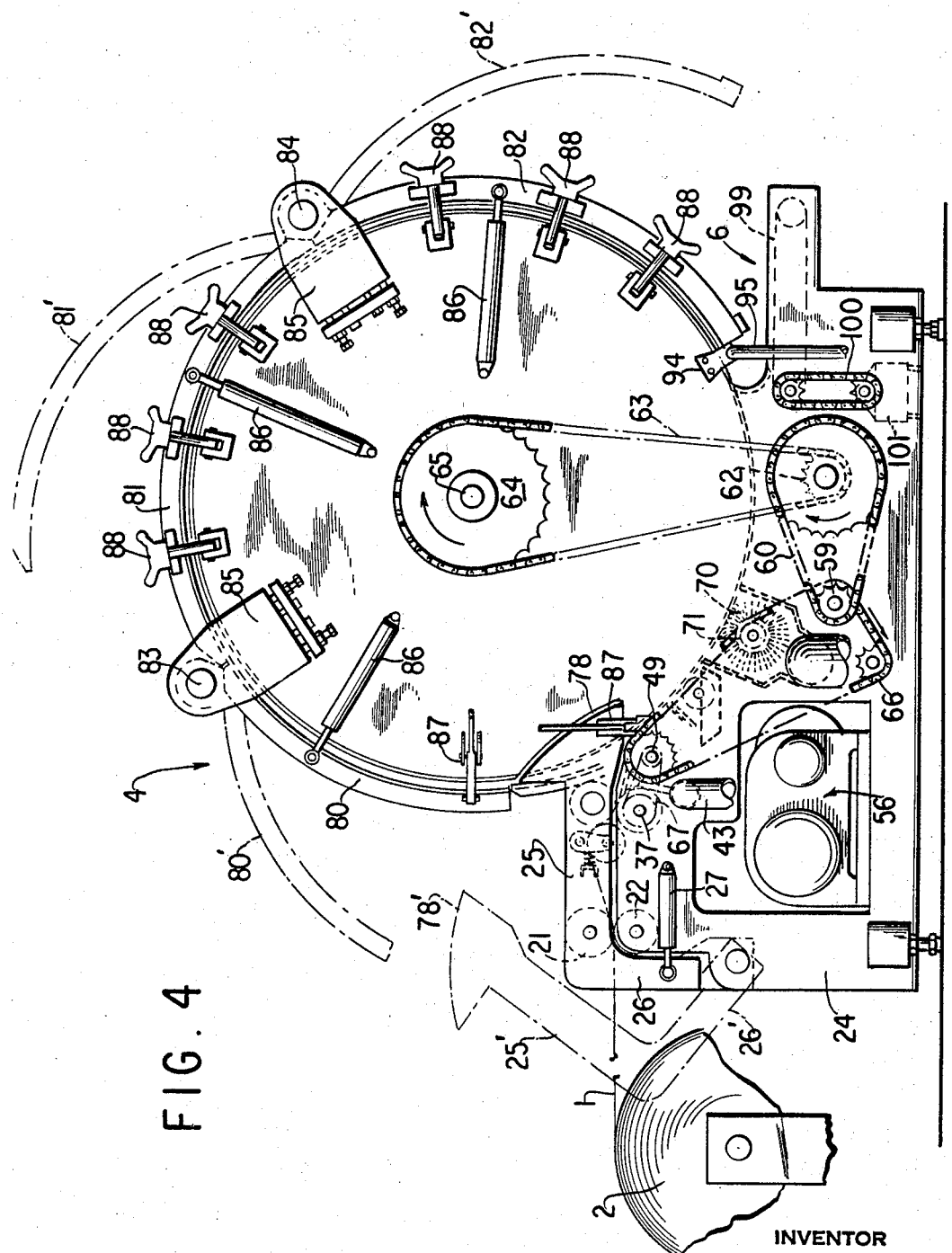

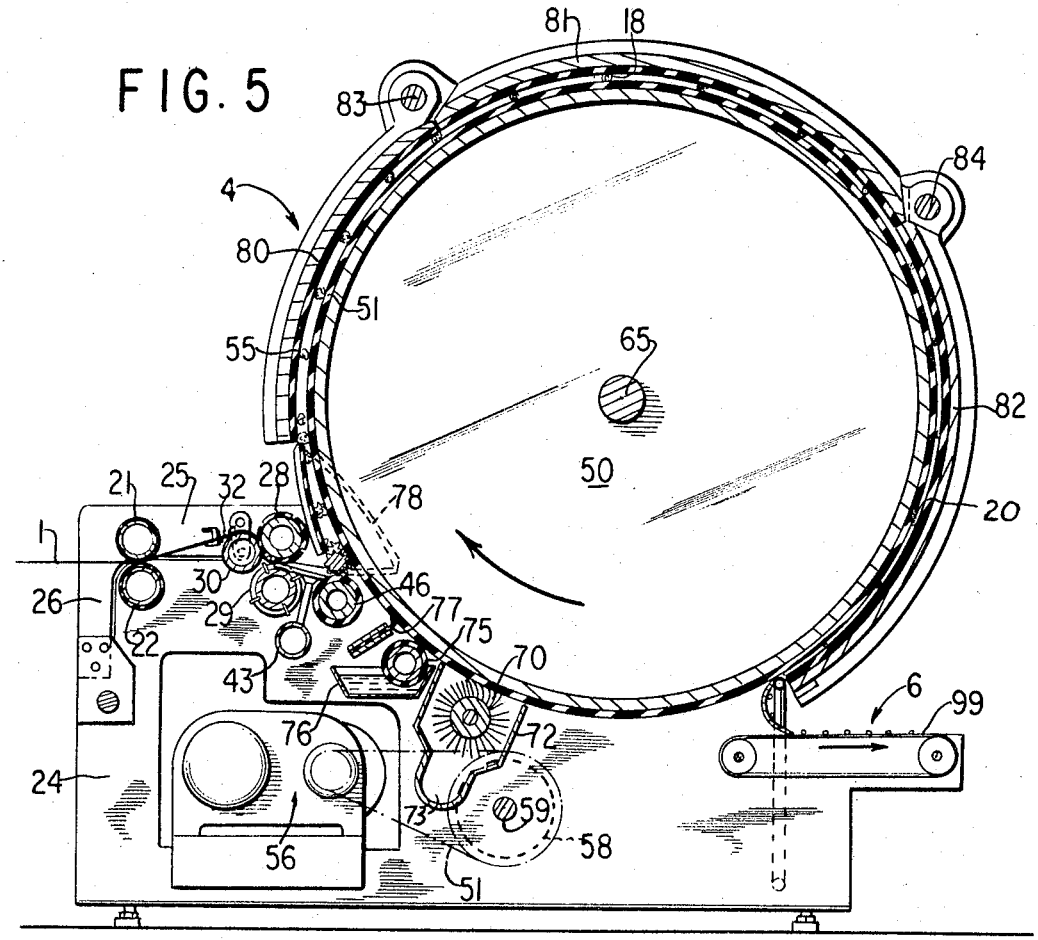
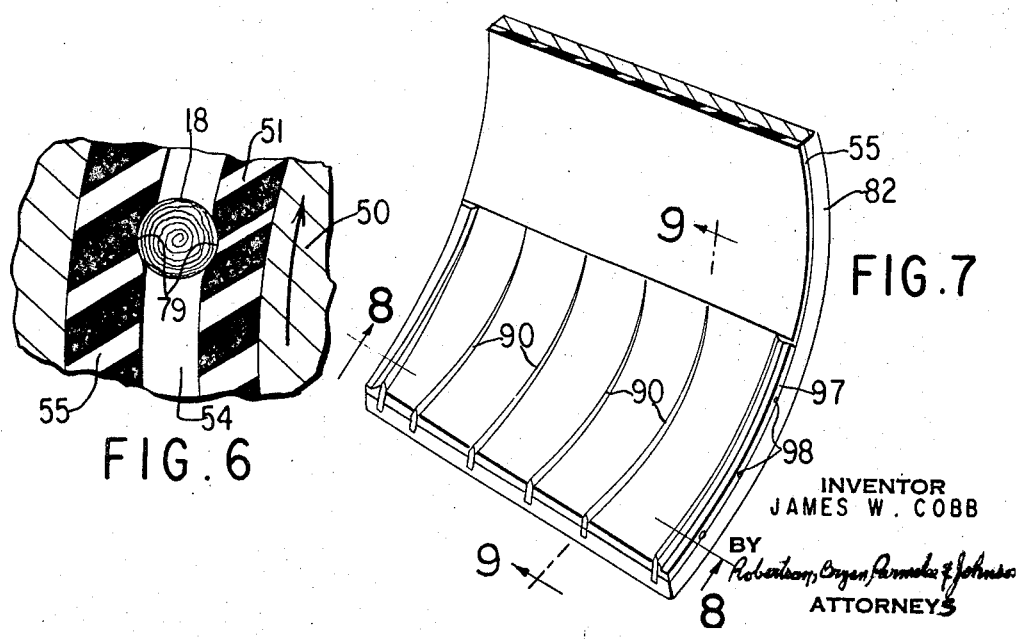

July 1, 1969 J. W. COBB 3,452,650
PROCESS AND MACHINERY FOR MAKING PAPER STICKS
Filed Feb. 17, 1966 Sheet 4 of 6

INVENTOR
JAMES W. COBB
BY
Robertson, Bryan, Parmelee & Johnson
ATTORNEYS

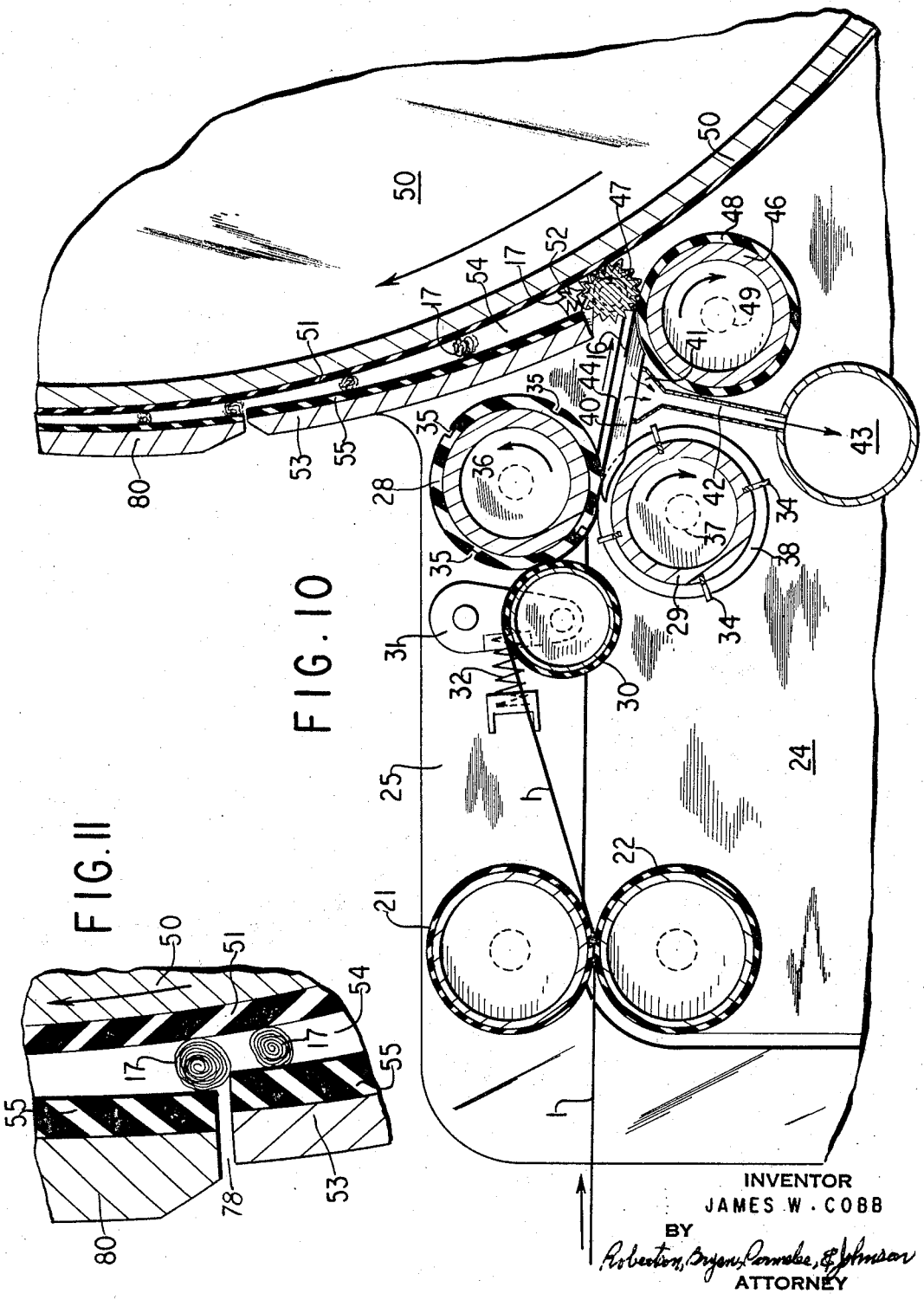

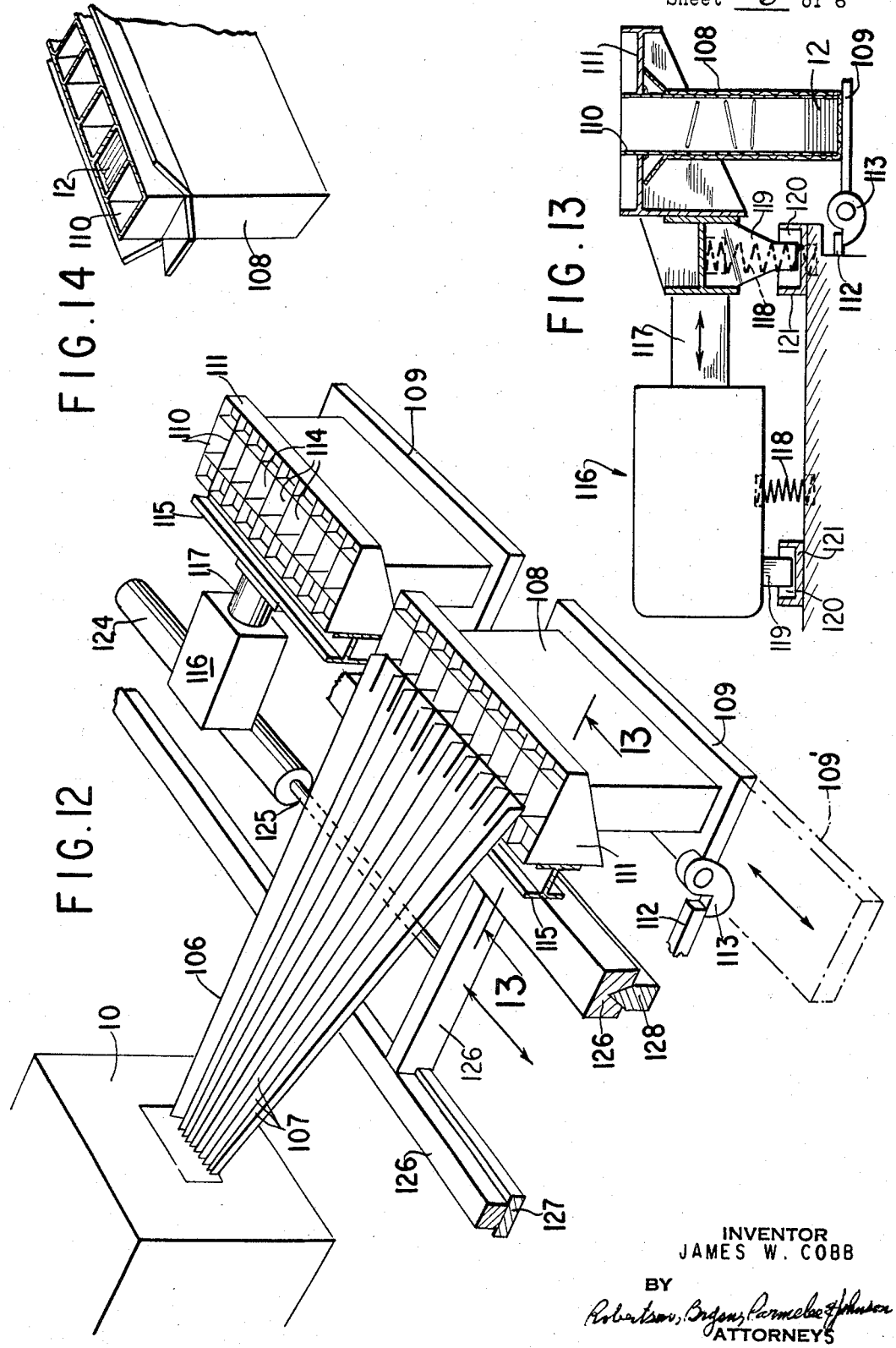

United States Patent Office 3,452,650
Patented July 1, 1969

3,452,650
PROCESS AND MACHINERY FOR MAKING PAPER STICKS
James W. Cobb, Tarrytown, N.Y., assignor to AEL Development and Research, Inc., Norwalk, Conn., a corporation of New York
Filed Feb. 17, 1966, Ser. No. 538,124
Int. Cl. B31c *11/04;* B31f *7/00;* B31d *5/00*
U.S. Cl. 93—1     19 Claims

ABSTRACT OF THE DISCLOSURE

Process and machinery for making paper sticks by tightly rolling and compacting sections of a paper web by pre-forming each section into a loosely curled roll, applying opposed, resilient, high friction surfaces against opposite sides of the rolls, moving these surfaces relative to each other and decreasing the spacing between them to form long paper rods which are cut into a multiplicity of sticks. The drum and shell frame structure disposed around the drum are each coated on their opposed surfaces with a resilient, tough, rubber-like layer. In the machinery as shown the sticks are dried by high frequency alternating voltage and are packaged.

---

This invention relates to a process and machinery for making paper sticks by tightly rolling and compacting sections of a paper web and for automatically packing large numbers of the sticks in adjacent parallel relationship in cartons in readiness for shipment and for dispensing them.

Paper sticks are being used increasingly for holding cotton swabs or appliactors, in lollipops and for similar uses. They are replacing wood sticks and are finding new fields of utility because they have the qualities of flexibility, freedom from splintering, and uniform appearance and coloration.

In the prior art are disclosed various machines for making paper sticks, but they have suffered shortcomings which have reduced their actual output in practice far below their theoretical output. For example, in some cases these prior machines have been very critical with respect to jamming and damage resulting from jamming so that any inadvertent increase in the quantity of paper or thickness of paper being fed into the machine jammed it up, necessitating disassembly. Whereas, in the process and machinery of this invention there is a large tolerance in accepting larger or thicker sections of paper web than intended. For example, in testing the machine as shown, sections of paper 5 to 6 times the intended length have been fed in, and the machine converted them into paper sticks having 5 to 6 times the intended mass, without any jamming or hesitation. The process and machine are also capable of handling lesser amounts of excess in-feed without jamming. This capability to handle extreme varations in quantity of in-feed provides reliable operation with minimum attention from the operator. The result is a consistent high volume of production at low cost.

In the rolling and compacting of the paper sticks, the desired relationship is that the tightly rolling sticks remain perpendicular to the direction of rolling as they are being compacted, so that they will run true along the intended path without skewing or twisting. Special arrangements have been included in some machines to catch and to straighten out skewed or bent paper sticks. Whenever a stick happened to become twisted too far out of line, then a jam up of the machine was likely to occur. Also, it is noted that instability in steering limits the length of the paper stick which could be made. The machine described herein provides very stable steering action so that the paper rod which is rolled is enabled to be slightly more than five times the desired stick length. Then this rod is cut and trimmed to produce 5 sticks of equal length. The result is an actual output of 150,000 sticks per hour.

By virtue of the stability in steering and tolerance to avoid jam ups this high output rate is provided with very little wastage of paper stock.

Because of stability of steering, the position of each rod after rolling is closely determined, and so it is not necessary to cut off a relatively large portion at each end to allow for any indeterminateness in position. Moreover, the amount of paper stock consumed in trimming is minimized because the length of each rod being rolled is equal to five times the final product, and the trimming only occurs at the ends of the rod as it is being cut up into sticks.

Also, the large output rate of sticks produced as described is automatically loaded in side-by-side parallel relationship into cartons in readiness for shipping and dispensing.

In accordance with the process of the present invention paper sticks are formed by separating a paper web into sections. Each section is pre-formed into a loosely curled roll and a pair of opposed, resilient, high friction surfaces are applied against opposite sides of the roll, and these surfaces are moved relative to each other in a direction perpendicular to the axis of each roll for rolling them between the resilient surfaces. The spacing between the opposed surfaces is decreased for tightly compacting the rolls and the compacting rolls are partially embedded into both resilient surfaces for steering the rolls to maintain their axes perpendicular to the direction of relative motion to form long paper rods. These rods are each cut into a multiplicity of sticks.

In accordance with the packaging process the carton and paper sticks being packed therein are vibrated back and forth parallel with the desired direction in which the sticks are intended to lie to produce parallel side-by-side stacking of the sticks.

Among the many advantages of the process and machinery of the present invention are those resulting from the fact that they enable the accurate formation of long paper rods each of which can be cut into a multiplicity of paper sticks of the desired length. Thus, the production output rate is high. Another advantage is that this process and machinery is tolerant of large excesses in in-feed so as to avoid causes of jamming. Each paper roll is steered true along its desired path so that they do not skew and jam up. Moreover, the present invention avoids jamming by enabling the machinery to handle excess quantities of of paper stock even up to five times the normal amount without jamming.

In addition, the high volume of output is automatically packaged into adjacent parallel relationship in a carton in readiness for shipping and dispensing from the carton.

In the specification and in the accompanying drawings are described and shown the process and machinery for manufacturing and for packing paper sticks embodying this invention, but it is to be understood that these examples of embodiments of the invention are not intended to be exhaustive nor limiting of the invention. These are examples of my presently known best mode of carrying out the invention and are given in order that others skilled in the art may fully understand the invention and the ways in which it may be applied to the conditions of a particular use.

The various objects, aspects, and advantages of the present invention will be in part pointed out and in part will be apparent from the following description of process and machinery embodying this invention, when considered in conjunction with the accompanying six sheets of drawings, in which:

FIGURE 1 is a side elevational view of a system for manufacturing and for packing paper sticks;

FIGURE 2 illustrates the use of a paper stick in a confection;

FIGURE 3 illustrates steps in the process of making the paper sticks;

FIGURE 4 is an enlarged side elevational view of the stick manufacturing machine;

FIGURE 5 is a sectional view of the machine of FIGURE 4;

FIGURE 6 is an enlarged view illustrating a step in the process;

FIGURE 7 is a partial perspective view showing the method of cutting the long paper rod into a multiplicity of sticks of the desired length and of trimming very short nubs off from each end of the rod;

FIGURES 10 and 11 illustrate input portions of the machine as shown in FIGURE 4;

FIGURE 12 is a perspective view illustrating the packing process and apparatus;

FIGURE 13 is a sectional view taken along the line 13—13 of FIGURE 12; and

FIGURE 14 shows one of the packing containers and chutes.

Figure 9:
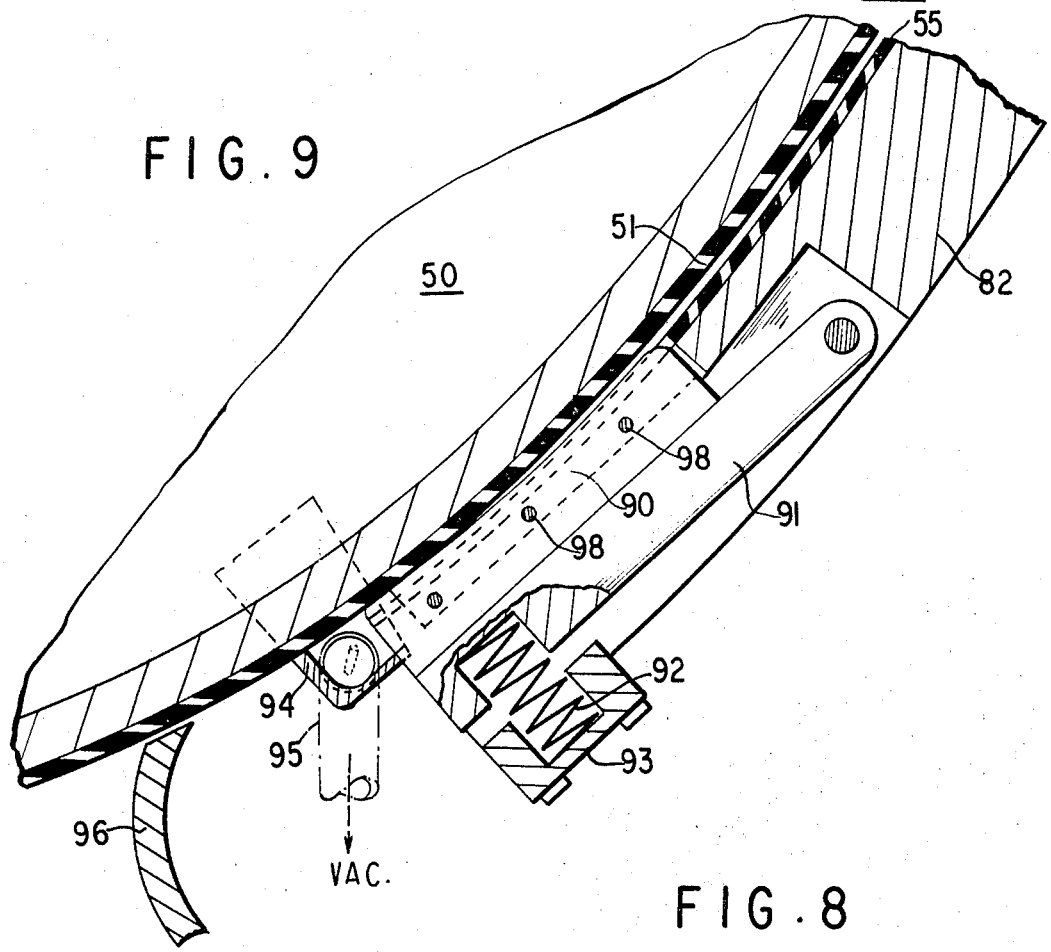
FIGURE 9 is a sectional view taken along the line 9—9 in FIGURE 7 and showing the mounting of one of the knives.

As shown in FIGURE 1, a web of paper 1 is fed from a supply roll 2 into a machine 4 which carries out the process of this invention for forming sections of the paper web into sticks and delivers them onto an output conveyor 6. The paper sticks are then lifted by an upwardly inclined conveyor 8 which includes a wide belt having spaced cleats on the belt so as to carry the sticks up to a vibrator conveyor 9 and thence into drying apparatus 10 for removing any excess moisture from within the individual sticks. After being dried the sticks are fed into an automatic packing machine 11 carrying out the packing process of this invention.

The paper sticks which are formed are useful for a wide variety of applications, for example as shown in FIGURE 2, a paper stick 12 is being used as the handle for a confection 13. As discussed in the introduction other typical uses of such paper sticks are for holding cotton swabs or applicators, and the like.

As shown in FIGURE 3, in this process the paper web 1 is advancing in the direction of the arrow and is initially cut along a zig-zag line 14 leaving several short uncut connections 15 between the paper section 16 and the web. The section 16 is then pulled ahead faster than the uncut web so as to tear it loose along the cut line 14. This separation of each section 16 from the web takes place in a suction air stream, as will be explained in detail in connection with FIGURE 10 further below, and thus any small paper shreds which may be created in the cutting and tearing operations are disposed of by the air stream.

The paper section 16 is creased and crimped so that it is pre-formed into a loosely curled roll 17 which is rolled and compacted into a paper rod 18. After further compacting and rolling a tightly compacted rod 20 is formed, and small nubs 19 are trimmed off from each end of this rod, while it is being cut into five equal sticks 12. The nubs 19 are trimmed off in a manner to allow them to drop free, as will be described in detail further below, and they are immediately taken away by vacuum, indicated by the legends in FIGURE 3. The sticks 12 are then conveyed away, dried and packed.

The machine 4 is shown in greater detail in FIGURES 4 to 10 to which attention is now invited in connection with the following description. The paper web 1 is fed into the machine 4 between a pair of idling guide rolls 21 and 22, the lower roll 22 being mounted upon the main frame 24 of the machine. These rolls are covered with a tough layer of wear-resistant material such as polyurethane. The upper roll 21 is mounted upon a hinged front frame section 25 which swings up and outwardly, as indicated in FIGURE 4 by the dash and dot outline 25' to provide convenient access for cleaning, inspection or servicing. This front section 25 includes a downwardly extending leg 26 which is pivoted upon a hinge shaft down below the input end of the machine. By virtue of this hinge arrangement the front section 25 can be swung up and outwardly so as to provide a relatively large access space around the operating parts, as will be apparent from FIGURE 4. A pneumatic cylinder 27 connected to the leg 26 and a corresponding cylinder on the opposite side of the machine serve to lift the section 25 when desired by the operator.

The web 1 is drawn into the machine by the cooperative action of a pinch roller 30 and a pair of contra-rotating rolls 28 and 29. The roll 29 is the knife roll, which has a plurality of blades 34 mounted therein, and the roll 28 has a corresponding number of recesses 35 into which the respective blades 34 enter when they are cutting the web passing between the rolls 28 and 29. The rolls 28 and 29 are driven by synchronism, and the pinch roll 30, which is an idler roll covered by a tough layer of wear-resistant material such as polyurethane, is mounted upon movable support means 31. This pinch roll is urged toward the roll 28 by spring means 32, and the web 1 travels over this pinch roll and then it curves partially around the roll 28, which is also covered by a layer of tough wear-resistant material such as polyurethane, having the recesses 35 cut therein.

The blades 34 are shaped to produce the zig-zag cuts 14 (FIG. 3), and the rolls 28 and 29 are kept in synchronism as they rotate by a pair of meshing gears (not shown) of equal diameter mounted upon the respective shafts 36 and 37. When the frame section 25 is raised, these gears become unmeshed, and they are re-engaged in their initial relationship when the frame 25 is lowered back down into its operating position as shown in FIGURE 10.

In order to strip the cut web off from the roll 29 and to direct forwardly, a plurality of parallel guide elements 40 extend into circumferential grooves 38 in the roll 29, and these guide elements also form bridge means extending across the open mouth of a vacuum chamber 41 communicating through a passage 42 with a suction source duct 43. The knife blades 34 have gaps therein aligned with the grooves 38 and with the ends of the elements 40, and it is these gaps in the blades which leave the uncut paper connections 15 (FIG. 3). By virtue of the air flow down into the vacuum chamber 41 the rapidly advancing end 44 of the web 1 is held down flush against the bridge elements 40 and is thus prevented from fluttering up out of the desired path in spite of its fast forward movement.

The downstream ends of the guide elements 40 are curved and rest closely adjacent to the surface of a resilient coated crimp anvil roll 46, cooperating with a steel crimp roll 47, which has a multi-pointed star shape as seen in cross section in FIG. 10 formed by a plurality of longitudinally extending V-shaped ridges. These V-shaped ridges press the leading end of the paper web firmly against the rubber layer 48 so as to crimp the paper into a plurality of parallel creases causing the paper to tend to curl. The roll 46 has a shaft 49, and it is driven at a peripheral speed which extends the peripheral speed of the draw rolls 28 and 29. Thus, as soon as the leading end of the web is engaged between the crimping rolls 46 and 47, the web is placed under tension and the leading section 16 of the web is torn loose along the line of zig-zag cuts 14 (FIG. 3).

FIGURE 10 shows the paper section 16 being torn loose from the leading end 44 of the web. The separation occurs near the center of the guide elements 40 where they span over the vacuum chamber 41, and thus any small shreds of paper which may occur are sucked down into the duct 43 so as to be disposed of.

In order to provide this tension separation as described occurring over the vacuum chamber 41, the width W of the paper section 16 (FIG. 1) as measured in the direction of travel is less than the distance of paper travel from the region of engagement between the rolls 28 and 29 to the region of engagement between the crimp rolls 46 and 47. In this example, the width W of each paper section 16 is only ⅔ of the paper travel from the rolls 28 and 29 to the rolls 46 and 47. Also, the peripheral speed of the roll 46 is significantly greater than the peripheral speed of the knife roll 29, so as to produce a rapid separation along the zig-zag cut line 14 (FIG. 3) while this cut line is travelling over the bridge elements 40. It is this differential in speed which accelerates the leading paper section 16 for tearing it loose from the travelling web. As an example, it is noted that in this machine the ratio of the peripheral speed of the resilient crimp roll 46 to the peripheral speed of the knife roll 29 is approximately 3 to 2, but other ratios may be used so long as the periphery of the roll 46 is travelling at a sufficiently greater rate to produce the tearing separation while the cut line 24 is travelling over the guide elements 40.

After the paper section 16 has been crimped by the action of the V-shaped ridges in pressing the paper against the rubber layer 48, it clings to the roll 47 and is carried around this roll near to a large revolving drum 50 having a resilient, high friction layer 51 thereon. There is a sufficient clearance between the crimped paper on the roll 47 and the surface layer 51 of the revolving drum 50 to assure that the drum does not touch the paper until after the paper has been stripped off from the roll 47.

To strip the crimped, loosely curled roll 17 off from the roll 47, there are a plurality of stripper blades 52 having their curved lower ends fitting into circumferential grooves in the roll 47. Thus, the loosely curled roll 17 is fed into a converging channel 54 defined between the periphery of the drum and the resilient surface 55 of a concave shoe 53. The tight rolling and compacting of the paper roll is described in detail further below.

As shown in FIGURE 5, the drive mechanism for the machine 4 includes an electric motor and adjustable speed transmission unit 56 which is connected by a sprocket and chain 57 to an electro-magnetic clutch and electro-magnetic brake unit 58 coupled to a main drive shaft 59. The chain 57 and clutch-brake unit 58 are located on the far side of the machine as seen in FIGURE 5, and the drive shaft 59 extends out to the near side of the machine, as seen in FIGURE 4. Secured to the main shaft 59 is a sprocket for driving a heavy chain 60 (FIG. 4) engaging a large sprocket 61, which in turn drives a smaller sprocket 62 and a heavy chain 63 engaging a large sprocket 64 on the drum shaft 65 for revolving the drum 50 (FIG. 5). The drum 50 is revolved at a peripheral speed which exceeds the peripheral speeds of the crimp rolls 46 and 47. The main drive shaft 59 also includes a sprocket engaging chain 66 which serves to drive a sprocket on the shaft 49 of the crimp roll 46 (FIGS. 5 and 10). In order to drive the contra-rotating rolls 28 and 29 at a slower peripheral speed than the crimp rolls, there is a smaller sprocket on the shaft 49 which drives a chain 67 engaging a larger sprocket on the shaft 37 of the knife roll 29.

To keep the periphery of the drum 50 free from paper fibers or flecks of paper, there is a stiff bristled brush 70 (FIGS. 4 and 5) which is rotated in a direction counter to the drum surface by means of the chain 66 passing over a sprocket 71 on the brush shaft. A U-shaped vacuum housing 72 (FIG. 5) surrounds this brush 70 and has an open mouth closely adjacent to the drum surface 51. A suction source duct 73 is connected to the bottom of this U-shaped suction housing and serves to draw away any paper fibers or flecks which have been loosened from the drum 50 by action of the contra-rotating brush 70.

For aiding in compacting and bonding the paper rolls being formed, the surface of the drum 50 is moistened by a water-transfer roller 75 rotating partially submerged in a water supply trough 76. Excess water is stripped off from the drum surface by a flexible stripper blade 77 so that the drum surface remains moist. This moisture has the effect of softening the paper being rolled and compacted. Also, a bonding of the rolled paper is produced as a combined result of the moisture, pressure and work-heating which occurs during the rolling process acting upon the constituents of the paper stock which includes sizing material containing starch.

In FIGURE 5, the dotted lines 78 show the line of separation between the main frame 24 and the end of the hinged front frame section 25. A toggle clamp 87 (FIG. 4) locks the frame section 25 down in place during operation. When the frame section 25 is raised, the web 1 remains conveniently gripped between the pinch roll 30 and the recessed roll 28, and the web separates along the cut line 14 which is over the guide elements 40. The suction flow into the chamber 41 is shut off during cleaning, inspection or servicing, and it is turned on before the machine is started again. This suction air flow guides the leading end 44 of the web so as to re-thread it into the bite of the crimp rolls 46 and 47 while the machine is jogged ahead. As soon as the crimp rolls have gripped the leading end of the web, the machine can be turned up to its full speed of 500 of the sections 16 per minute, which produces 2,500 of the paper sticks 12 per minute. In this particular example the width W is 4 inches so that the linear speed of the web 1 is 167 feet per minute. I believe that this machine is capable of higher speeds, but there has been no occasion for me to run it at higher speed.

Inviting attention again to FIGURE 10 it is noted that the loosely curled roll 17 enters the channel space 54 which extends around the drum. This channel space 54 is defined on the inside by the resilient, high friction layer 51 of rubber on the drum and by a corresponding resilient, high friction layer 55 of rubber, which is supported by a sequence of concave frame sections or shoes 53, 80, 81 and 82 etxending around a major portion of the periphery of the drum. The first concave frame member 53 is included as part of the front frame section 25. The second concave frame section 80 is mounted upon a hinge pivot shaft 83, and the third and fourth concave frame sections 81 and 82 are both mounted upon a common hinge pivot shaft 84, the shafts 83 and 84 being secured to the main frame 24 by supports 85.

When it is desired to inspect or service the drum or the frame shells 80, 81 or 82, or in the event a paper jam up should occur, then these shells can be swung open about the respective hinge pivots 83 and 84, as indicated by dash and dotted outlines at 80', 81' and 82'. They are swung outwardly by actuating pneumatic cylinders 86, and when they are closed in their normal operating positions they are secured in place by means of toggle clamps 87 and screw clamps 88. The spacing between the rubber layers 51 and 55 is determined by spacer blocks (not shown) which are inserted adjacent to the respective clamps 87 and 88. In order to provide accurate lateral alignment of the shells 53, 80, 81, and 82 with the main frame 24, these spacer blocks seat against 45° sloping surfaces. Also, the positions of the pivot shafts 83 and 84 can be adjusted by moving the supports 85, as indicated in FIGURE 4 by the stop screws and lock nuts adjacent to the respective bases of the supports 85.

In order to convert the loosely convoluted roll 17 into a tightly rolled paper rod 18 and then to compact it further into the compacted paper rod 20, the resilient, high-friction layer 55 converges toward the resilient, high friction layer 51 in the direction of drum rotation so that the channel 54 becomes progressively narrower. An initial tightening of the roll is produced beneath the layer 55 on the shell 53, which converges toward the drum as shown in FIGURE 10. Then a slight momentary relief in the tightening occurs, as indicated in FIGURES 10 and 11, when the paper roll 17 transfers across the separation 78 and enters beneath the shell 80. The initial spacing of the channel 54 near the strippers 52 is approximately ¾ of an inch, and the final spacing near the knives 90 (FIGS. 7, 8, and 9) is approximately 3/32 of an inch, to produce a stick 12 having a diameter of ⅛ of an inch.

As the rods 18 are being compacted, as shown in FIGURE 6, they are effectively steered by the powerful frictional engagement with the opposed resilient rubber layers 51 and 55 each of which has a thickness greater than the diameter of the finally compacted rod 20 which is produced. The rod being compacted embeds itself slightly in both surfaces 51 and 55 as indicated by the indentations 79. This produces a substantial area of firm rolling friction contact on both sides of the compacting rod 18 and so this embedded frictional contact steers the rod along a true path by preventing slippage. Moreover, this resilience accommodates overfeeding up to 5 to 6 times the intended amount without jamming.

Figure 8:
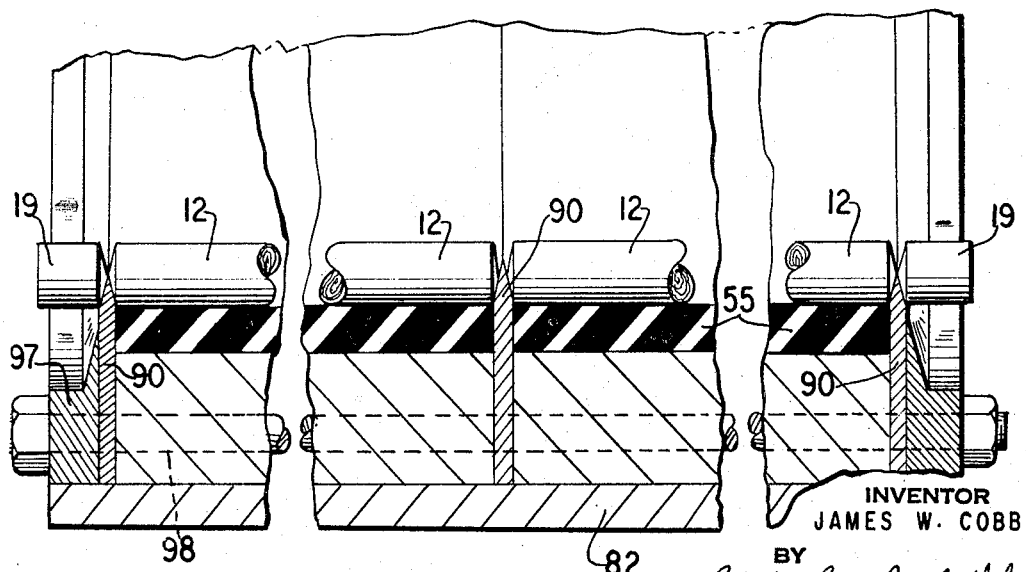
FIGURE 8 is a partial sectional view taken along the line 8—8 in FIGURE 7 and shown enlarged.

As shown in FIGURE 7 there are six uniformly spaced knives 90 mounted upon movable arms 91 and which are urged toward their operative positions by means of springs 92 held by anchoring members 93. The nubs 19 which are trimmed off are allowed to fall free so that they are drawn into suction chambers 94 and are removed by ducts 95 connected to a vacuum source, such as a suction blower. The two outer knife holders 97 are held by bolts 98 and slope away from the respective outer knives 90 as shown in FIGURES 7 and 8 to allow the nubs 19 to drop away freely. Between the knives 90 the resilient rubber layer 55 is continued, as shown in FIGURE 7, for rolling and steering the sticks 12 being cut, indicated in FIGURE 8.

In the event an over feed of paper should occur, resulting in an over size rod 20, then the spring means 92 yield to allow the resulting sticks to pass through the cutting region without jamming. Stops (not shown) prevent the knife blades 90 from touching the drum surface 51.

As the cut sticks 12 are discharged from the machine 4, a deflector 96 (FIGURE 9) guides them down onto a moving belt 99 of the delivery conveyor 6. This belt 99 is driven by a chain 100 (FIGURE 4) and by drive means 101. The cut sticks travel up the inclined belt 8 and along the conveyor 9 onto the belt 102 of a dielectric drier unit 10. A series of parallel conductive bars 103 extend beneath the belt 102, and these bars 103 are energized by high frequency alternating voltage to drive off the moisture from within the sticks. This moisture is drawn off through a duct 104.

So far as I am aware, the positioning of the grill bars 103 beneath the conveyor belt 102 is novel. The reason for doing this is to prevent the piles of sticks on the belt 102 from jamming up against bars 103. The high frequency dielectric drier which energizes these bars is a commercially available unit. The belt 102 is chosen to exhibit low dielectric losses at the frequency of operation, for example this belt is formed of glass cloth.

As shown in FIGURES 1 and 12 the dried sticks 12 are transferred from the drier belt 102 onto a linear vibratory conveyor 106 including a plurality of diverging channel ways 107 which have their open discharge ends positioned above a carton 108 into which the sticks 12 are to be loaded. This carton is supported upon a plate 109 and is divided up by a series of adjacent parallel, rectangular metal tubes 110 which extend down into the carton to the bottom to partition it into numerous separate compartments 114. The carton is long and narrow, and it is desired to package the sticks transversely of the carton as appears in FIGURES 13 and 14.

At their upper ends the metal partitions 110 are fastened to a rigid framework 111 which is attached to a stiff beam 115. A powerful electromagnetic vibrator unit 116 has its reciprocating plunger 117 connected to the beam 115, and it violently vibrates the partition tubes 110 back and forth in a direction transversely of the carton 108. The partitions 110 fit snugly within the carton so that the carton is captured and is forced to vibrate as a unit with the tubes 110, its lower end sliding on the plate 109.

In this process the carton 108 and the paper sticks 12 being packed therein are vibrated back and forth parallel with the desired direction in which the sticks are intended to lie to produce parallel side-by-side packing of the sticks. The sticks tumble down into the respective compartments 114 which have a dimension transversely of the carton 108 just slightly larger than the length of the sticks 12, as seen in FIGURE 13, but their other dimension is too narrow for the sticks to lie in a direction longitudinally of the carton. FIGURE 14 illustrates the relationship of the partitions 110 forming compartments each having their larger dimensions transverse of the carton. In order to cause all of the sticks to lie parallel side by side as they tumble at the rate of 2,500 sticks per minute into the carton, the amplitude of vibration is large and the resulting agitation is intense at 60 cycles per second.

The vibrator 116 is mounted on springs 118 with retainer elements 119 projecting down into slots 120 in blocks 121 mounted upon a chassis 126.

When the carton 108 is full, a cylinder 124 having a rod 125 connected to the chassis 126 is actuated to slide the whole chassis toward the foreground into the position indicated at 109' as viewed in FIGURE 12. The chassis 126 slides upon fixed tracks 127 and 128. This chassis movement brings an empty carton 108 and the associated vibrator apparatus 110, 111, 115, 116 and 117 into position beneath the discharge ends of the conveyor channel ways 107. The full carton, which is now above the position 109', is ready to be removed. A latch 112 is disengaged from a hingle member 113, allowing the support plate 109 to swing down. The carton is pulled down off from the partitions 110 and the parallel sticks all remain packed in the carton because the bottom of the compartments 114 are open. An empty carton is slipped up around the partitions 110, and the support plate 109 is then latched up in place in readiness for the chassis to be shifted back to its position as shown when the next carton is full.

In order to provide the desired amplitude of vibration all of the vibrating parts 110, 111 and 115 are made light but rigid, in this example being made of aluminum. The beam 115 and framework 111 prevent significant deflection under the intense vibration and assure that all of the compartments 114 are being vibrated with equally large amplitude.

From the foregoing it will be understood that the process and machinery for making and packaging paper sticks embodying the present invention as described above are well suited to provide the advantages set forth. The terms and expressions which I have employed are used in a descriptive and not a limiting sense, and I have not intention of excluding equivalents of the invention described and claimed.

What is claimed is:

1. The process of forming paper sticks by tightly rolling and compacting sections of a paper web comprising the steps of pre-forming each section of the paper web into a loosely curled roll; applying a pair of opposed, resilient, high friction surfaces against opposite sides of the rolls; moving said surfaces relative to each other in a direction perpendicular to the axes of said rolls for rolling them therebetween; decreasing the spacing between said opposed surfaces for tightly compacting said rolls and for steering the rolls to maintain their axes perpendicular to the direction of relative motion to form long paper rods; and cutting each of said paper rods into a multiplicity of sticks.

2. The process of forming paper sticks as claimed in claim 1, in which the paper rods being compacted are partially embedded on both sides of the rod into the opposed, resilient, high friction surfaces.

3. The process of forming paper sticks as claimed in claim 1, in which one of said opposed, resilient high friction surfaces is continuously revolved, and moisture is applied to said one surface prior to the application of said one surface against the loosely curled rolls.

4. The process of forming paper sticks as claimed in claim 3, including the steps of drying and packing the sticks in a continuous operation.

5. The process of forming paper sticks as claimed in claim 1, in which the paper web is advanced along a path, a section to be separated from the leading end of the web is defined by creating a partially cut tear line extending transversely of the web, said section is accelerated and torn loose from the advancing web along said tear line to form a separate section, and said separate section is crimped to be pre-formed into a loosely curled roll.

6. The process of forming paper sticks as claimed in claim 5 in which the leading end of the web after said section has been torn loose is guided by a suction air flow which also serves to draw away any shreds of paper which may become loose while said section is being torn loose along said tear line.

7. The process of forming paper sticks as claimed in claim 6 in which said section is accelerated as it is being pre-formed into said loosely curled roll.

8. The process of forming paper sticks as claimed in claim 1 in which said long paper rods are rolled between said pair of opposed resilient high-friction surfaces as they are being cut into a multiplicity of sticks.

9. The process of forming, drying and packaging paper sticks as claimed in claim 4 and wherein the sticks are dried while continuously moving by high frequency alternating voltage applied from beneath the sticks to drive off the moisture.

10. In a machine for forming paper sticks by tightly rolling and compacting sections of paper web, a drum arranged to rotate about its axis, said drum having a surface coated with a first resilient, tough, rubber-like layer, and a shell frame structure disposed around the periphery of the drum having its inner surface coated with a second resilient, tough, rubber-like layer converging with the first rubber-like layer in the direction of rotation of the drum.

11. In a machine for forming paper sticks as claimed in claim 10, said first and second resilient, tough, rubber-like layers defining a channel extending partially around said drum for tightly rolling and compacting long paper rods, and said shell frame including a plurality of uniformly spaced knives converging toward said first surface near the discharge end of said channel for cutting each of said rods into a multiplicity of sticks.

12. In a machine for forming paper sticks as claimed in claim 11, said shell frame including a resilient, tough, rubber-like, concave layer disposed between said knives for frictionally rolling said rods as they are being cut into sticks.

13. In a machine for forming paper sticks as claimed in claim 12, movable mounting means supporting said knives, and spring means urging said knives toward said first resilient layer for accommodating the cutting of oversize rods.

14. In a machine for forming paper sticks as claimed in claim 12, said shell frame defining clearance spaces adjacent to the outside of the two outer knives, a suction chamber communicating with each of said clearance spaces, and a vacuum duct for removing the nubs cut from the opposite ends of said rods as the sticks are being cut.

15. In a machine for forming paper sticks as claimed in claim 10, said shell frame structure including a plurality of arcuate frame members hinged to swing away from the drum, clamp means for securing said arcuate members in operating position near said drum, and lift means for swinging said arcuate members away from the drum for cleaning and servicing of the machine.

16. A machine for forming paper sticks by tightly rolling and compacting a section of paper web comprising means for advancing the paper web at a predetermined speed, means for creating a partially cut tear line extending across the web to define a paper section, a pair of opposed crimping rolls, drive means for rotating said crimping rolls at a higher peripheral speed than the speed of advancement of said web, guide means including a vacuum chamber having an open mouth and a plurality of guide elements spanning across said open mouth for guiding the leading end of the web toward the bite of said crimping rolls for tearing said paper section loose from the advancing web along said tear line and for pre-forming said paper section into a loosely curled roll, a revolving drum, and a shell structure disposed about said drum for tightly rolling and compacting said roll.

17. A machine as claimed in claim 16 in which said means for creating a partially cut tear line includes a knife roll having a plurality of circumferential grooves therein and said guide elements extend into said grooves.

18. A machine as claimed in claim 17 in which said knife roll includes a plurality of blades and a recessed roll opposed to said knife roll, and said recessed roll and one of said crimp roll being mounted upon a hinged front section of the machine adapted to be swung up and outwardly for inspection and servicing.

19. A machine as claimed in claim 16 including means for cleaning said drum as it revolves, means for moistening said drum and for removing excess water before contact with the loosely curled paper sections, and high frequency voltage drying means for drying said sticks.

References Cited

UNITED STATES PATENTS

| | | | |
|---|---|---|---|
| 1,730,675 | 10/1929 | Meyer | 93—1 |
| 2,308,538 | 1/1943 | Decker | 93—1 |
| 2,406,033 | 8/1946 | Perkins | 93—1 |
| 2,699,098 | 1/1955 | Lyons | 93—1 |
| 3,155,016 | 11/1964 | Pellicone et al. | 93—1 |

WILLIAM S. LAWSON, *Primary Examiner.*